United States Patent
Kim

[19]

[11] Patent Number: 6,069,976
[45] Date of Patent: May 30, 2000

[54] APPARATUS AND METHOD FOR ADAPTIVELY CODING AN IMAGE SIGNAL

[75] Inventor: Jin-Hun Kim, Seoul, Rep. of Korea

[73] Assignee: Daewoo Electronics Co., Ltd., Rep. of Korea

[21] Appl. No.: 09/054,702

[22] Filed: Apr. 3, 1998

[51] Int. Cl.$^7$ ........................................................ G06K 9/00
[52] U.S. Cl. ................................................. 382/239; 382/242
[58] Field of Search .................................... 382/242, 239, 382/236, 238, 241, 232, 176; 358/430; 348/415, 420

[56] References Cited

U.S. PATENT DOCUMENTS

| | | | |
|---|---|---|---|
| 4,656,500 | 4/1987 | Mori ........................................ | 358/430 |
| 5,249,048 | 9/1993 | Sugiyama ................................ | 348/415 |
| 5,647,024 | 7/1997 | Kawauchi et al. ...................... | 382/232 |
| 5,696,842 | 12/1997 | Shirasawa et al. ..................... | 382/176 |
| 5,774,596 | 6/1998 | Kim ........................................ | 382/242 |
| 5,822,460 | 10/1998 | Kim ........................................ | 382/239 |
| 5,881,175 | 3/1999 | Kim ........................................ | 382/242 |
| 5,929,917 | 7/1999 | Kim ........................................ | 382/242 |
| 5,946,043 | 8/1999 | Lee et al. ................................ | 348/420 |

Primary Examiner—Bijan Tadayon
Assistant Examiner—Amir Alavi
Attorney, Agent, or Firm—Anderson Kill & Olick

[57] ABSTRACT

In an apparatus for adaptively coding an image signal including a contour signal and a texture signal having object pixels and background pixels thereof, wherein the contour signal discriminates between the object pixels and the background pixels and each of the background pixels and the object pixels is represented by luminance data and chrominance data, a padding circuit replaces each background pixel value with a pixel value derived from object pixel values by using a predetermined padding method to thereby generate a padded texture signal. And then, a luminance data extracting circuit extracts the luminance data from the padded texture signal to provide a modified texture signal, each pixel of the modified texture signal having the luminance data. Thereafter, a frame/field correlation evaluating channel, based on the contour signal and the modified texture signal, evaluates a frame-correlation of a frame of the modified texture signal and a field-correlation of the top-field and the bottom-field thereof and then decides to encode the image signal on a frame-by-frame basis if the frame-correlation is higher than the field-correlation to thereby generate a frame coding mode signal and if otherwise, decides to encode the image signal on a field-by-field basis to thereby generate a field coding mode signal.

20 Claims, 5 Drawing Sheets

APPARATUS AND METHOD FOR ADAPTIVELY CODING AN IMAGE SIGNAL

FIELD OF THE INVENTION

The present invention relates to an apparatus and method for coding an image signal; and, more particularly, to an apparatus and method for adaptively coding an image signal based on the frame/field correlation of an image signal.

DESCRIPTION OF THE PRIOR ART

In a digitally televised system such as video-telephone, teleconference or high definition television system, a large amount of digital data is needed to define each video frame signal since a video line signal in the video frame signal comprises a sequence of digital data referred to as pixel values. Since, however, the available frequency bandwidth of a conventional transmission channel is limited, in order to transmit the large amount of digital data therethrough, it is necessary to compress or reduce the volume of data through the use of various data compression techniques, especially, in the case of such low bit-rate video signal encoders as video-telephone and teleconference systems.

One example of such object-oriented coding scheme is the so-called MPEG (Moving Picture Experts Group) phase 4 (MPEG-4), which is designed to provide an audio-visual coding standard for allowing content-based interactivity, improved coding efficiency and/or universal accessibility in such applications as low-bit rate communication, interactive multimedia (e.g., games, interactive TV, etc.) and area surveillance.

According to MPEG-4, an input video image is divided into a plurality of video object planes (VOP's), which correspond to entities in a bitstream that a user can access and manipulate. A VOP can be referred to as an object and represented by a bounding rectangle whose width and height may be a smallest multiples of 16 pixels (a macro-block size) surrounding each object so that the encoder may process the input video image on a VOP-by-VOP basis.

A VOP described in MPEG-4 includes shape information, i.e., a contour signal and color information, i.e., a texture signal consisting of luminance data and chrominance data, wherein the shape information is represented by, e.g., a binary mask. In the binary mask, a designated binary value, e.g., 0, is used to represent a background pixel, i.e., a pixel located outside the object in the VOP and another binary value, e.g., 255, is used to indicate an object pixel, i.e, a pixel located inside the object.

Before encoding is applied to an image signal, e.g., a digital image frame signal or a VOP having an object on a block-by-block basis, it is desirable to perform padding on the texture signal of the image signal in order to prevent coding efficiency from being degraded due to high frequency pixel data in a background or a region outside the object in the image signal. Therefore, each background pixel value in the texture signal of the image signal is normally padded with a pixel value derived from the object pixel values by using a conventional padding method.

For example, in a conventional mean padding method, each pixel value in the background of an image signal, e.g., a VOP is padded with an average value of all pixel values in the object of the VOP. And in a conventional repetitive padding method, each pixel value within a background in a VOP is padded with a pixel value derived from the boundary pixels of the VOP (see *MPEG-4 Video Verification Model Version* 7.0, International Organization for Standardization, Coding of Moving and Associated Audio Information, ISO/IEC JTC1/SC29/WG11 MPEG97/N1642, Bristol, April 1997, pp 40–41). After the padding is applied to the texture signal, the padded texture signal is encoded by using transform coding technique with or without motion estimation (ME) and motion compensation (MC) technique.

Meanwhile, in view of scan types, video sequences of an image signal can be classified into two types; progressive scan video sequences and interlaced scan video sequences. In the progressive scan video sequences, a frame in the sequences is captured and processed sequentially line by line from top to bottom of the frame. An interlaced scan video frame consists of two fields; an even-field or a top-field made up of even lines of the frame and an odd-field or a bottom-field made up of odd lines of the frame. Capturing and processing of the two fields are performed first on the top-field, sequentially from top to bottom of the field, and then followed by the bottom-field in the same manner.

The prior research results on encoding an image signal can be classified into three categories; a frame coding process, a field coding process and an adaptive coding process which employ both the frame coding process and the field coding process to encode an image signal.

In the frame coding process, video sequences are basically coded frame-by-frame basis where the top-fields and the bottom-fields thereof are combined in the interlaced manner (the frames are treated as if they were progressive). In the frame coding process, each frame is usually partitioned into blocks of pixel data which are then processed on a block-by-block basis by using a transform coding method such as a Discrete Cosine Transform (DCT) coding method as described in , e.g., Chen and Pratt, "Scene Adaptive Coder", *IEEE Transaction on Communications*, COM-32, No. 3, pp. 225–232 (March 1984).

In the field coding process, a video sequence is first split into two sequences, i.e., a top-field and a bottom-field, and then each of the top-field and the bottom-field is subjected to the same coding process in a similar manner to the frame coding process.

It is known in the art that the frame coding process is efficient in case that stationary regions within an image signal are coded by making use of the high spatial correlations therein; and the field coding process can encode regions corresponding to the moving objects within the image signal more effectively than the frame coding process in case that a better correlation is found within each field in these regions.

In the adaptive coding process, an image signal is coded on a frame-by-frame basis if the correlation of a frame of the image signal is higher than that of the top-field and the bottom-field of the frame and if otherwise, the image signal is coded on a field-by-field basis.

In recent years, the adaptive coding process has attracted much attention because of its high efficiency and flexibility in encoding the image signal. For example, U.S Pat. No 5,347,308 issued to Lucas et al. discloses a typical conventional adaptive coding method and apparatus for adaptively coding an image signal. Referring to FIG. 1, there is illustrated a block diagram of the apparatus disclosed in U.S. Pat. No 5,347,308 of Lucas et al. for adaptively coding an image signal. In the apparatus of Lucas et al., an input frame 1 of an image signal is first partitioned into a plurality of blocks of pixel data by a block partition process And then, a block, i.e., each of the blocks is subjected to an inter-field difference detection process 3 that examines the differences between the pixel data of the two fields within the block. It should be noticed here that the inter-field difference detection process 3 can be regarded as a frame/field correlation calculating (or evaluating) process for each of the blocks.

One example of the inter-field difference detection process 3 would be to calculate a first mean square error (MSE) between line pairs, each line pair including an even-line and an adjacent odd-line in a block, e.g., a block 4 shown in FIG. 1 and compare the first MSE with a second MSE calculated between the consecutive odd-line pairs and the consecutive even-line pairs of the same block; and then, if the ratio of the first MSE over the second MSE is greater than a predetermined threshold value, the block will be coded by a field coding process 5; if otherwise, the block will be coded by a frame coding process 6.

Encoded data for each of the blocks from the field coding process 5 and from the frame coding process 6 are transmitted as channel information, respectively. And resultant data 7 obtained by the inter-field difference detection process 3 for each of the blocks is coded as side-information or extra-information for each block.

The apparatus of Lucas et al., however, entails a considerable amount of computational burdens and additional transmission data since the inter-field difference detection process 3 is performed on whole blocks within the image signal; and side-information for the whole blocks within the image signal are coded and transmitted on a block-by-block basis.

Further, it is known in the art that a contour of an object in an image signal is very important to evaluate motion of the object in encoding the image signal. But, the conventional adaptive coding apparatus and/or method such as that of Lucas et al. or any other prior art, in a process of frame/field correlation calculating (or evaluating) of an image signal, e.g., a VOP, having an object, could not utilize a contour signal included in the image signal. Namely, the conventional apparatus and/or the method fails to render the frame/field correlation calculating (or evaluating) process for the image signal simple and effective and decrease the amount of extra-information for the image signal. Therefore, the conventional apparatus and/or the method have limitation in enhancing the coding efficiency thereof.

SUMMARY OF THE INVENTION

It is, therefore, a primary object of the present invention to provide an apparatus and method for adaptively coding an image signal based on the frame/field correlation calculated by using a contour signal of the image signal to render the frame/field correlation evaluating process simple and decrease the amount of extra-information for the image signal to thereby enhance the coding efficiency thereof.

In accordance with the present invention, there is provided an apparatus for adaptively coding an image signal including a contour signal and a texture signal having object pixels within an object and background pixels within a background thereof, wherein the contour signal discriminates between the object pixels and the background pixels and each of the background pixels and the object pixels is represented by luminance data and chrominance data, the apparatus comprising: a padding circuit to replace each pixel value of the background pixels with a pixel value derived from values of the object pixels by using the contour signal in accordance with a predetermined padding method to thereby generate a padded texture signal; a luminance data extracting circuit for extracting the luminance data from the padded texture signal to thereby provide a modified texture signal, wherein each pixel of the modified texture signal has the luminance data; and a frame/field correlation evaluating channel, based on the contour signal and the modified texture signal, for frame/field correlation evaluating to evaluate a frame-correlation of a frame of the modified texture signal and a field-correlation of the top-field and the bottom-field thereof and then decide to encode the image signal on a frame-by-frame basis if the frame-correlation is higher than the field-correlation, thereby generating a frame coding mode signal and decide to encode the image signal on a field-by-field basis if the frame-correlation is not higher than the field-correlation, thereby generating a field coding mode signal, wherein the frame-correlation and the field-correlation are calculated in accordance with a predetermined rule.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
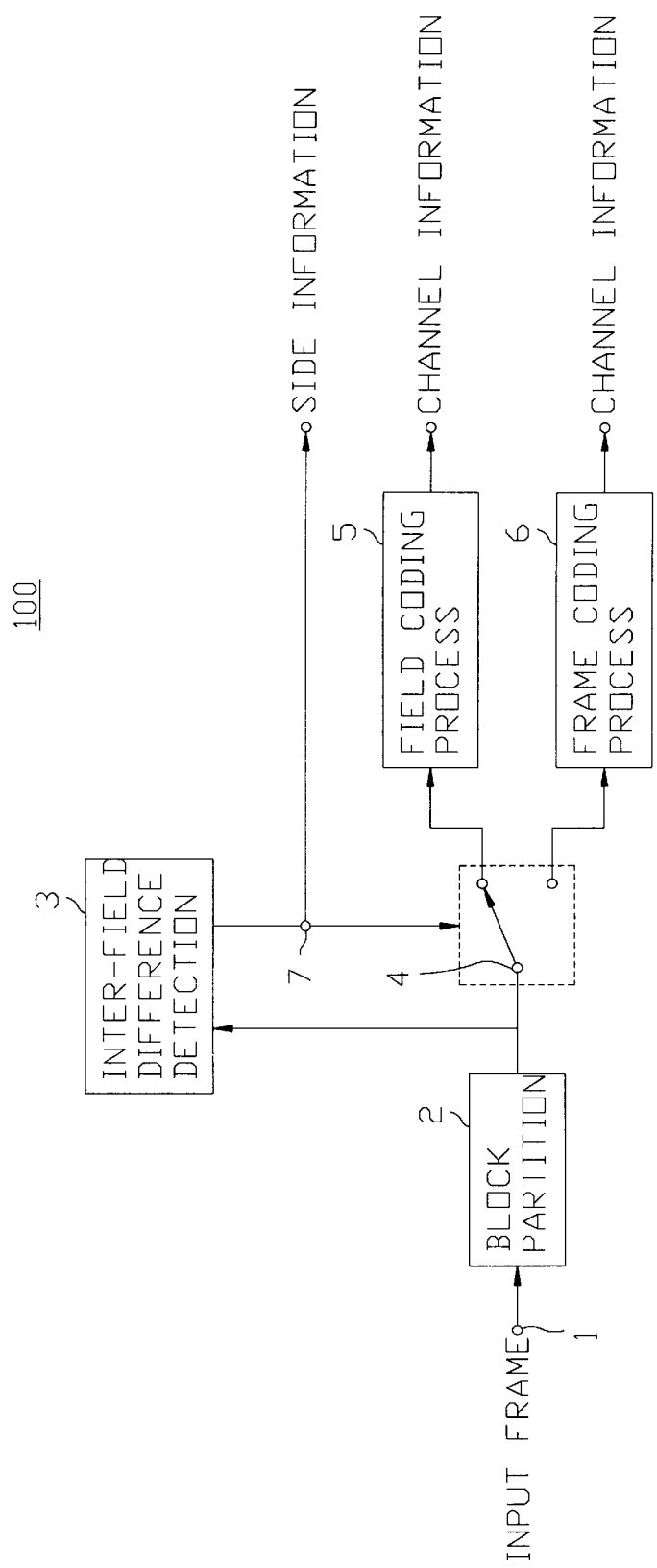
FIG. 1 illustrates a block diagram of a conventional apparatus for adaptively coding an image signal.
Figure 2:
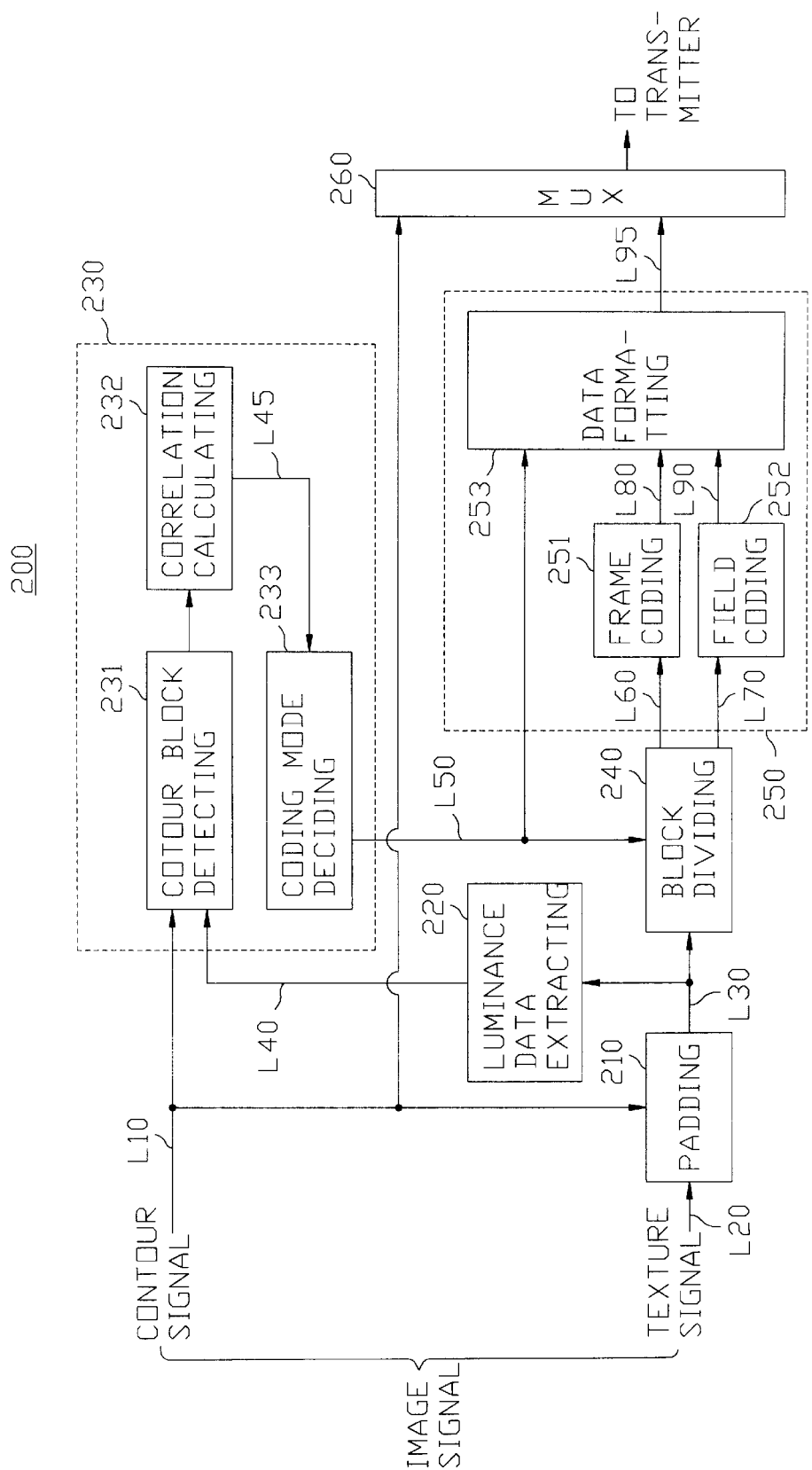
FIG. 2 shows a block diagram of an apparatus for adaptively coding an image signal in accordance with a preferred embodiment of the present invention.

Referring to FIG. 2, there is shown a block diagram of an apparatus 200 for adaptively coding an image signal in accordance with a preferred embodiment of the present invention. The image signal includes a texture signal having object pixels within an object and background pixels within a background thereof. The image signal also includes a contour signal discriminating between the object pixels and the background pixels within the texture signal. Each of the object pixels and the background pixels within the texture signal is represented by luminance data and chrominance data. The image signal is typically a video object plane (VOP). And the image signal may also be a digital image frame including an object.

The contour signal includes mask data having a first binary value and a second binary value, wherein the first binary value, e.g., 255, is used to designate an object pixel and the second binary value, e.g., 0, is used to indicate a background pixel. Therefore, it is possible to discriminate between the object and the background within the texture signal by using the mask data included in the contour signal.

The encoding apparatus 200 comprises a padding circuit 210, a luminance data extracting circuit 220, a frame/field correlation evaluating channel 230, a block dividing circuit 240, a texture signal coding channel 250 and a multiplexer (MUX) 260. The frame/field correlation evaluating channel 230 includes a contour block detecting circuit 231, a correlation calculating circuit 232 and a coding mode deciding circuit 233. And the texture signal coding channel 250 includes a frame coding circuit 251, a field coding circuit 252 and a data formatting circuit 253.

First, the contour signal of the image signal is inputted to the contour block detecting circuit 231, to the padding circuit 210 and to the MUX 260 through a line L10. And the texture signal of the image signal is fed to the padding circuit 210 through a line L20. The padding circuit 210 performs padding on the texture signal.

In detail, the padding circuit 210 replaces each pixel value of the background pixels with a pixel value derived from values of the object pixels by using the contour signal inputted thereto through the line L10 in accordance with a predetermined padding method, e.g., a conventional mean padding method or a conventional repetitive padding method to thereby generate a padded texture signal on line L30. The padded texture signal is transmitted to the luminance data extracting circuit 220 and the block dividing circuit 240 through the line L30.

The luminance data extracting circuit 220 extracts luminance data from the padded texture signal to thereby provide a modified texture signal to the contour block detecting circuit 231 via a line L40, wherein each pixel of the modified texture signal has the luminance data.

The frame/field correlation evaluating channel 230, based on the contour signal and the modified texture signal, evaluates a frame-correlation of a frame of the modified texture signal and a field-correlation of the t-op-field and the bottom-field thereof and then decides to encode the image signal on a frame-by-frame basis if the frame-correlation is higher than the field-correlation, thereby generating a frame coding mode signal and decides to encode the image signal on a field-by-field basis if the frame-correlation is not higher than the field-correlation, thereby generating a field coding mode signal, wherein the frame correlation and the field-correlation are calculated in accordance with a predetermined rule. Examples of the predetermined rule is described hereinafter.

In detail, the contour block detecting circuit 231 in the frame/field correlation evaluating channel 230 first detects a plurality of equal-sized contour blocks of M×N pixels with M and N being predetermined positive integers, respectively, by using the contour signal inputted thereto through the line L10 and the modified texture signal inputted thereto via the line L40 to thereby supply the contour blocks to the correlation calculating circuit 232. It should be noticed here that each contour block is a block having one or more background pixels and one or more object pixels and a frame of each contour block is made by combining a top-field block having even-lines with a bottom-field block having odd-lines.

Figure 3:
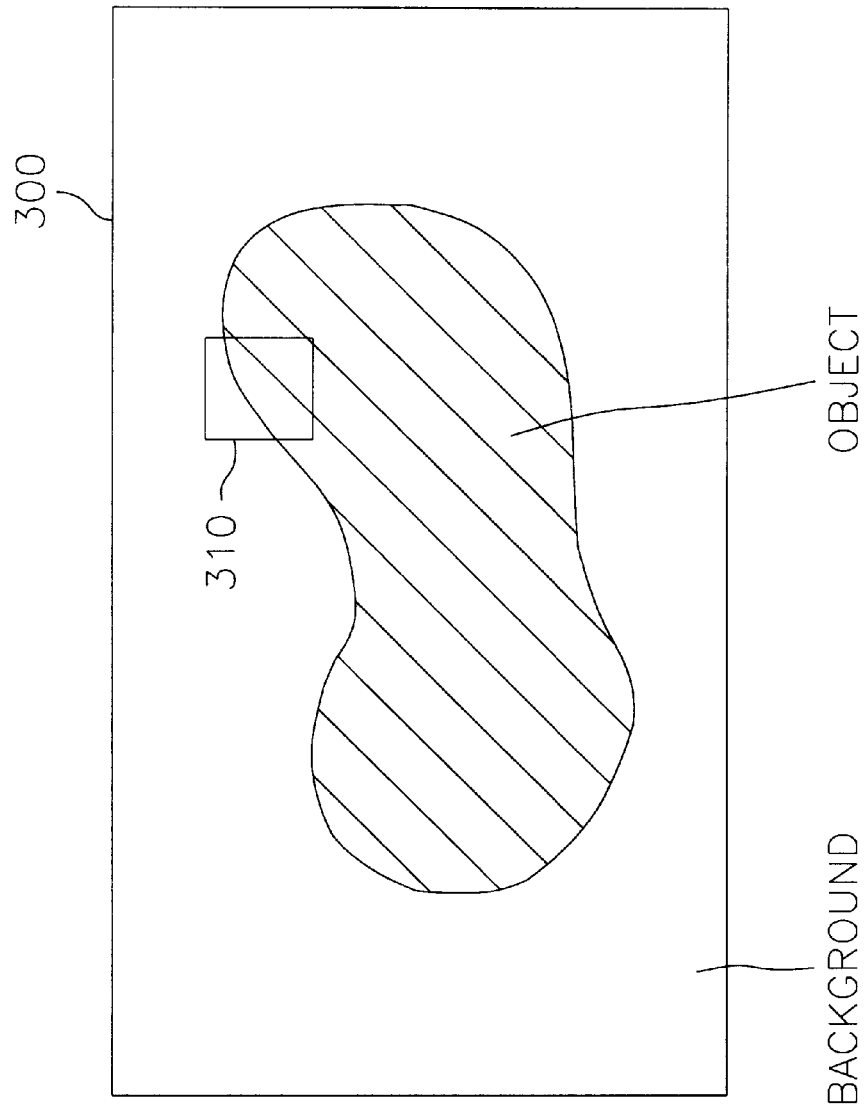
FIG. 3 depicts a modified texture signal including a contour block.
Figure 4:
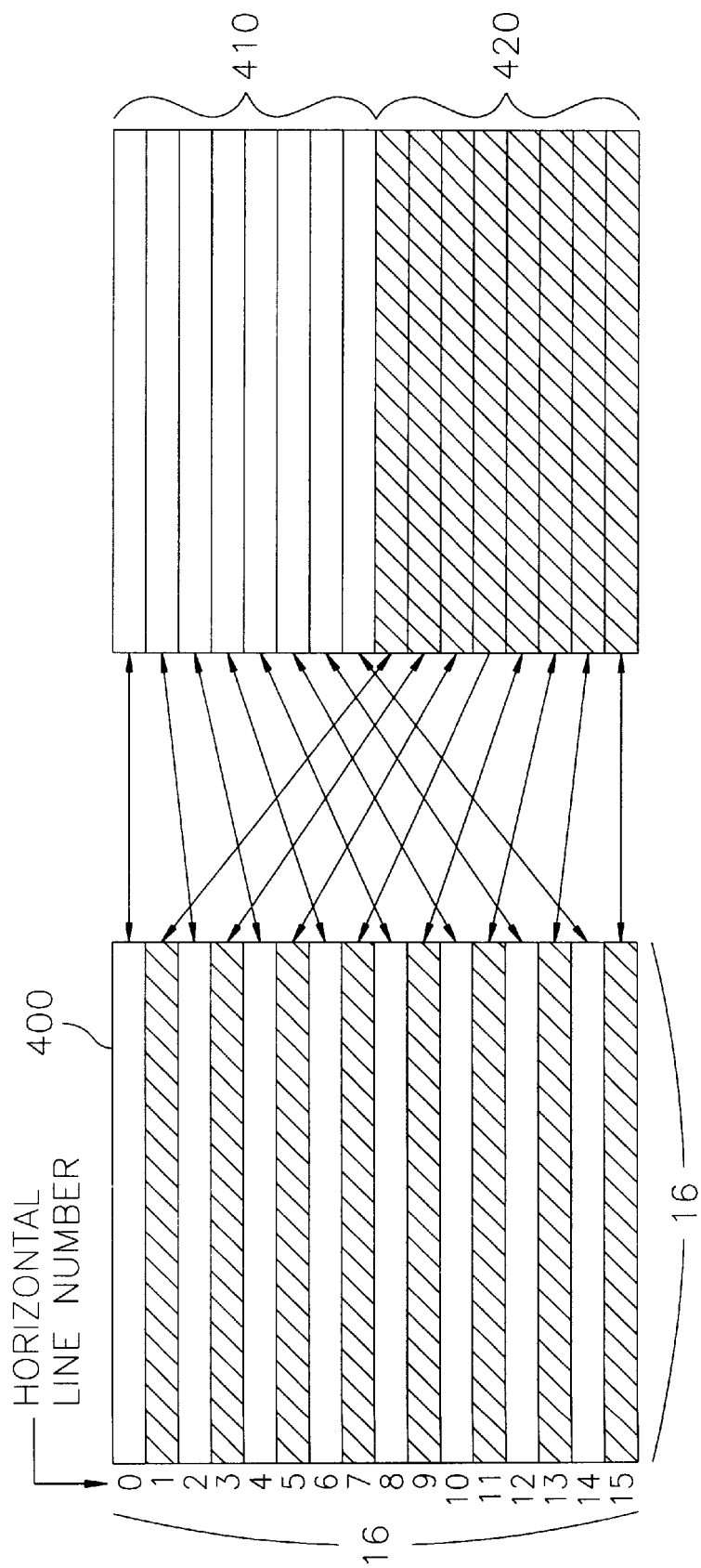
FIG. 4 presents an exemplary contour block made by combining a top-field block with a bottom-field block.

FIG. 3 depicts a modified texture signal 300 including a contour block 310, wherein a hatched region and an un-hatched region of the modified texture signal 300 represent an object and a background thereof, respectively. FIG. 4 presents an exemplary contour block 400 of 16×16 pixels made by combining a top-field block 410 of 16×8 pixels with a bottom-field block 420 of 16×8 pixels. The contour block 400 consists of 16 horizontal lines numbered from 0 to 15 as shown in FIG. 4. An un-hatched region and a hatched region in the contour block 400, the top-field block 410 and the bottom-field block 420, represent even-lines and odd-lines, respectively.

The correlation calculating circuit 232 calculates a block-frame correlation value (from now on referred to BRCV) and a block-field correlation value (from now on referred to BDCV) for a contour block inputted thereto from the contour block detecting circuit 231 to thereby produce BRCV's and BDCV's for the contour blocks on a line L45, respectively, wherein the BRCV is a correlation value calculated in accordance with a predetermined rule for the frame of the contour block; and the BDCV is a correlation value calculated in accordance with the predetermined rule for the top-field and the bottom-field of the contour block.

In accordance with a preferred embodiment of the present invention, the BRCV is a block-frame difference (referred to BRD) for the contour block and the BDCV is a block-field difference (referred to BDD) for the contour block. In the above, the BRD is a sum of absolute first differences, each first difference being an error between a line pair including an even-line and an adjacent odd-line of the contour block; and the BDD is a sum of absolute second differences and absolute third differences, each second difference and each third difference being errors between a consecutive even-line pair and between a consecutive odd-line pair, respectively, of the contour block.

In accordance with another preferred embodiment of the present invention, the BRCV is a block-frame square error (referred to BRS) and the BDCV is a block-field square error (referred to BDS) for the contour block. The BRS is a sum of first square errors, each first square error being a square error between a line pair including an even-line and an adjacent odd-line of the contour block; and the BDS is a sum of second square errors and third square errors, each second square error and each third error being square errors between a consecutive even-line pair and between a consecutive odd-line pair, respectively, of the contour block.

Referring to FIG. 4, the correlation calculating process performed by the correlation calculating circuit 232 will be described hereinafter in more details. In this case, for simplicity, it is assumed that the size of the contour block is 16×16 pixels, i.e., M and N are 16's, respectively, In accordance with a preferred embodiment of the present invention, the BRD and the BDD for a contour block of 16×16 pixels are calculated by using following equations 1 and 2, respectively,:

$$BRD = \sum_{i=0}^{6} \sum_{j=0}^{15} (|P_{2i,j} - P_{2i+1,j}| + |P_{2i+1,j} - P_{2i+2,j}|), \quad \text{(Equation.1.)}$$

$$BDD = \sum_{i=0}^{6} \sum_{j=0}^{15} (|P_{2i,j} - P_{2i+2,j}| + |P_{2i+1,j} - P_{2i+3,j}|) \quad \text{(Equation.2.)}$$

wherein $P_{h,v}$ represents a luminance value of a pixel located at the intersection of the h-th horizontal line and the v-th vertical line within the contour block, each of h and v ranging from 0 to 15.

In another preferred embodiment of the present invention, the BRS and the BDS for a contour block of 16×16 pixels are calculated by using following equations 3 and 4, respectively,:

$$BRS = \sum_{i=0}^{6} \sum_{j=0}^{15} ((P_{2i,j} - P_{2i+1,j})^2 + (P_{2i+1,j} - P_{2i+2,j})^2), \quad \text{(Equation.3.)}$$

$$BDS = \sum_{i=0}^{6} \sum_{j=0}^{15} ((P_{2i,j} - P_{2i+2,j})^2 + (P_{2i+1,j} - P_{2i+3,j})^2) \quad \text{(Equation.4.)}$$

wherein $P_{h,v}$ represents a luminance value of pixel located at the intersection of the h-th horizontal line and the v-th vertical line within the contour block, each of h and v ranging from 0 to 15. In the above equations 1–4, the horizontal line number h is counted in an ascending order from top to bottom in the contour block and the vertical line number v is counted in an ascending order from left to right in the contour block.

The coding mode deciding circuit 233, based on the BRCV's (e.g., BRD's) and the BDCV's (e.g., BDD's) for the contour blocks, performs a coding mode decision to thereby generate either a frame coding mode signal commanding to encode the image signal on a frame-by-frame basis or a field coding mode signal commanding to encode the image signal on a field-by-field basis.

In detail, in accordance with a preferred embodiment of the present invention, the coding mode deciding circuit 233 first counts a first number of first contour blocks and a second number of second contour blocks, wherein each of the first contour blocks is a contour block having a corresponding BRD equal to or less than a corresponding BDD and each of the second contour blocks is a contour block having a corresponding BRD greater than a corresponding BDD. And then the coding mode deciding circuit 233 generates a frame coding mode signal on a line L50 if the first number is equal to or greater than the second number and generates a field coding mode signal on the line L50 if the first number is less than the second number.

In accordance with another preferred embodiment of the present invention, the coding mode deciding circuit 233 sums up all of corresponding BRD's for all of the contour blocks to thereby generate a first sum and at the same time sums up all of corresponding BDD's for all of the contour blocks to thereby generate a second sum. And then the coding mode deciding circuit 233 compares the first sum with the second sum to thereby generate a frame coding mode signal on the line L50 if the ratio of the first sum over the second sum is equal to or less than a predetermined threshold value, e.g., 0.8, and generate a field coding mode signal on the line L50 if the ratio of the first sum over the second sum is greater than the predetermined threshold value. As a result, either the frame coding mode signal or the field coding mode signal is fed to the block dividing circuit 240 and the data formatting circuit 253 through the line L50.

The block dividing circuit 240, in response to the frame coding mode signal from the coding mode deciding circuit 233, divides the padded texture signal inputted thereto via the line L30 from the padding circuit 210, thereby supplying a plurality of equal-sized frame blocks of K×L pixels with K and L being predetermined positive integers, respectively, to the frame coding circuit 251 via a line L60. And the block dividing circuit 240, in response to the field coding mode signal from the coding mode deciding circuit 233, splits the padded texture signal into a top-field and a bottom-field thereof and then divides the top-field into a plurality of equal-sized top-field blocks of K×L pixels and dividing the bottom-field into a plurality of equal-sized bottom-field blocks of K×L pixels, thereby supplying the equal-sized top-field blocks of K×L pixels and bottom-field blocks of K×L pixels to the field coding circuit 252 via a line L70.

In the above, each of the frame blocks of K×L pixels supplied to the frame coding circuit 251 via the line L60 is made by combining a top-field block of K×(L/2) pixels having only even-lines with a bottom-field block of K×(L/2) pixels having only odd-lines; and each of the top-field blocks of K×L pixels and each of the bottom-field block of K×L pixels supplied to the field coding circuit 252 via the line L70 have only even-lines and only odd-lines, respectively.

Figure 5:
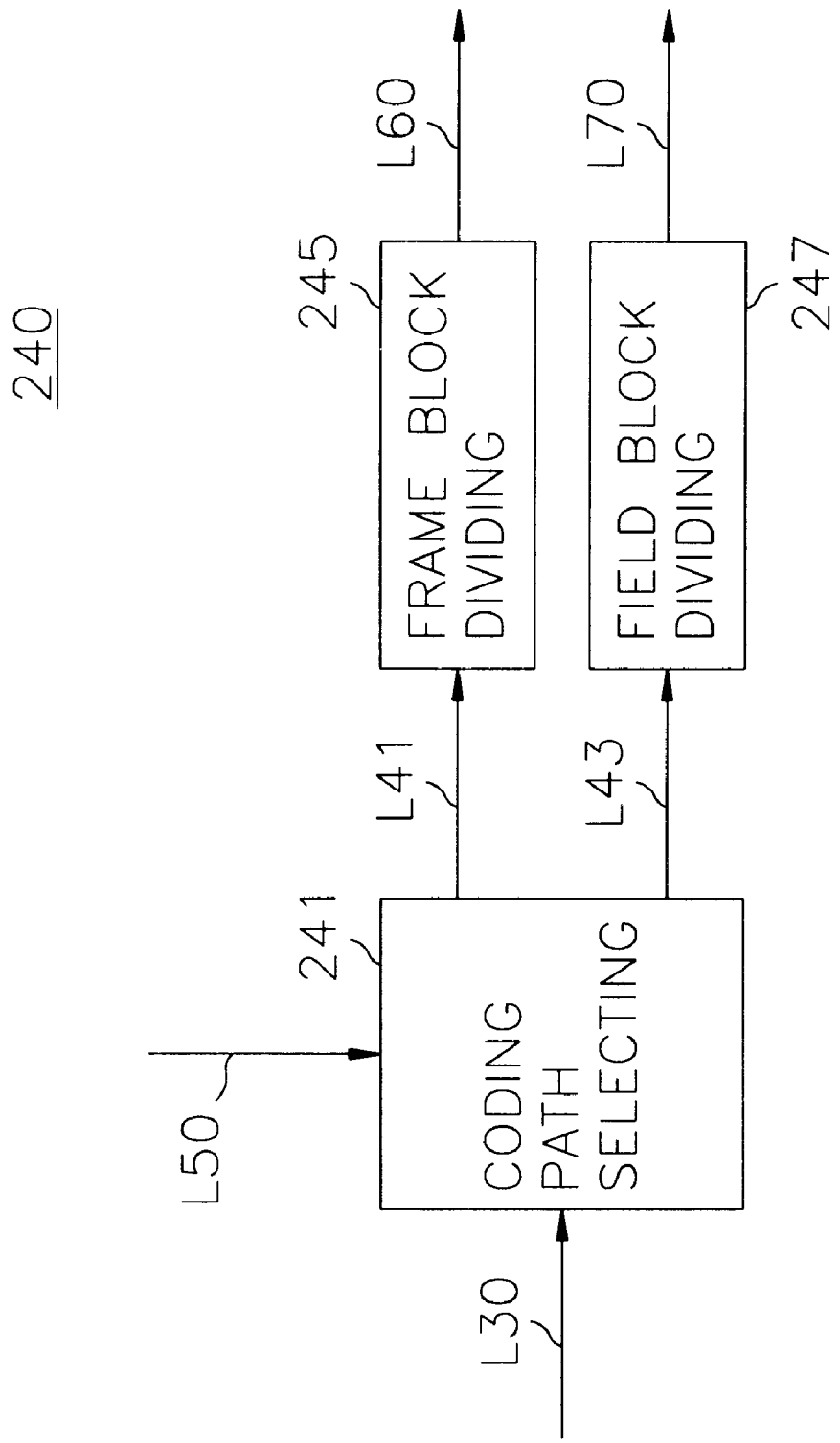
FIG. 5 represents a detailed block diagram of a block dividing circuit shown in FIG. 2 in accordance with a preferred embodiment of the present invention.

FIG. 5 represents a detailed block diagram of the block dividing circuit 240 shown in FIG. 2 in accordance with a preferred embodiment of the present invention. Referring to FIG. 5, the block dividing process performed by the block dividing circuit 240 will be described hereinafter in more details. The block dividing circuit 240 includes a coding path selecting circuit 241, a frame block dividing circuit 245 and a field block dividing circuit 247.

The coding path selecting circuit 241, in response to the frame coding mode signal from the coding mode deciding circuit 233, selects a frame-by-frame coding path to thereby provide the padded texture signal inputted thereto from the padding circuit 210 via the line L30 as a frame to the frame block dividing circuit 245 via a line L41. And the coding path selecting circuit 241, in response to the field coding mode signal from the coding mode deciding circuit 233, selects a field-by-field coding path to thereby split the padded texture signal inputted thereto from the padding circuit 210 into a top-field and a bottom-field and then provides both the top-field and the bottom-field to the field block dividing circuit 247 through a line L43.

The frame block dividing circuit 245 divides the frame inputted thereto into a plurality of equal-sized frame blocks of K×L pixels and then supplies the frame blocks to the frame coding circuit 251 through the line L60.

The field block dividing circuit 247 divides the top-field from the coding path selecting circuit 241 into a plurality of equal-sized top-field blocks of K×L pixels to thereby supply the top-field blocks of K×L pixels to the field coding circuit 252 through the line L70. And at the same time, the field block dividing circuit 247 divides the bottom-field inputted thereto via the line L43 into a plurality of equal-sized bottom-field blocks of K×L pixels to thereby supply the bottom-field blocks of K×L pixels to the field coding circuit 252 through the line L70.

The texture signal coding channel 250, if the frame coding mode signal is inputted thereto through the line L50, encodes the frame blocks inputted thereto via the line L60 on a frame-by-frame basis to thereby provide an encoded texture signal to the MUX 260 via a line L95. And the texture signal coding channel 250, if the field coding mode signal is inputted thereto through the line L50, encodes the top-field blocks and the bottom-field blocks inputted thereto via the line L70 on a field-by-field basis to thereby provide an encoded texture signal to the MUX 260 via the line L95.

In detail, the frame coding circuit 251 in the texture signal coding channel 250 encodes frame blocks by using a conventional frame coding method including a discrete cosine transform (DCT) coding method and a quantization method with or without motion estimation (ME) and motion compensation (MC) to thereby provide encoded frame blocks to the data formatting circuit 253 via a line L80.

The field coding circuit 252 encodes top-field blocks and bottom-field blocks by using a conventional field coding method including a DCT coding method and a quantization method with or without ME and MC to thereby provide encoded top-field blocks and encoded bottom-field blocks to the data formatting circuit 253 via the line L80, respectively. The DCT coding method described above is performed on a block-by-block basis, the block size typically being an 8×8 pixels. Namely, K and L are typically 8's, respectively.

The data formatting circuit 253 combines the frame coding mode signal with the encoded frame blocks if the frame coding mode signal is inputted thereto via the line L50 to thereby provide an encoded texture signal to the MUX 260 through the line L95. And the data formatting circuit 253 combines the field coding mode signal with the encoded top-field blocks and the encoded bottom-field blocks if the field coding mode signal is inputted thereto via the line L50 to thereby provide an encoded texture signal to the MUX 260 through the line L95. It should be noticed here that a frame coding mode signal and a field coding mode signal are extra-information for encoded texture signals corresponding thereto, respectively.

The MUX 260 multiplexes the contour signal inputted thereto via the line L10 and the encoded texture signal inputted thereto via the line L95 to thereby provide an encoded image signal to a transmitter (not shown) for the transmission thereof.

In accordance with the conventional apparatus and/or method, in encoding an image signal, extra-information for the image signal is attached to all of the blocks made by partitioning the image signal on a block-by-block basis to thereby increase considerable amount of extra-information. In contrast, in accordance with the present invention, in encoding an image signal, extra-information for the image signal is attached only to either the texture signal thereof or the top-field and the bottom-field thereof to thereby decrease the amount of extra-information.

In accordance with the present invention, there is provided an apparatus and method for adaptively coding an image signal based on a frame/field correlation calculated by using a contour signal of an image signal to render the frame/field correlation calculating (or evaluation) process for the image signal simple and decrease the amount of extra-information for the image signal, thereby enhancing the coding efficiency thereof.

while the present invention has been described with respect to the particular embodiments, it will be apparent to those skilled in the art that various modifications and changes may be made without departing from the spirit and scope of the invention as defined in the following claims.

what is claimed is:

1. An apparatus for adaptively coding an image signal including a contour signal and a texture signal having object pixels within an object and background pixels within a background thereof, wherein the contour signal discriminates between the object pixels and the background pixels and each of the background pixels and the object pixels is represented by luminance data and chrominance data, the apparatus comprising:

means for performing padding to replace each pixel value of the background pixels with a pixel value derived from values of the object pixels by using the contour signal in accordance with a predetermined padding method to thereby generate a padded texture signal;

means for extracting luminance data from the padded texture signal to thereby provide a modified texture signal, wherein each pixel of the modified texture signal has only the luminance data; and means, based on the contour signal and the modified texture signal, for frame/field correlation evaluating to evaluate a frame-correlation of a frame of the modified texture signal and a field-correlation of the top-field and the bottom-field thereof in accordance with a predetermined rule and then decide to encode the image signal on a frame-by-frame basis if the frame-correlation is higher than the field-correlation, thereby generating a frame coding mode signal and decide to encode the image signal on a field-by-field basis if the frame-correlation is not higher than the field-correlation, thereby generating a field coding mode signal, wherein the frame-correlation and the field-correlation are calculated in accordance with a predetermined rule.

2. The apparatus according to claim 1, wherein said frame/field correlation evaluating means includes:

means for detecting a plurality of equal-sized contour blocks of M×N pixels with M and N being predetermined positive integers, respectively, by using the contour signal and the modified texture signal to thereby supply the contour blocks, wherein each of the contour blocks is a block having one or more background pixels and one or more object pixels; and a frame of said each of the contour blocks is made by combining a top-field block having even-lines with a bottom-field block having odd-lines;

means for calculating a block-frame correlation value (referred to BRCV) and a block-field correlation value (referred to BDCV) for said each of the contour blocks to thereby produce BRCV's and the BDCV's for said contour blocks, wherein the BRCV is a correlation value calculated in accordance with a predetermined rule for the frame of said each of the contour blocks and the BDCV is a correlation value calculated in accordance with the predetermined rule for the top-field block and the bottom-field block of said each of the contour blocks; and means for deciding coding mode of the image signal based on the BRCV's and the BDCV's to thereby generate either the frame coding mode signal commanding to encode the image signal on a frame-by-frame basis or the field coding mode signal commanding to encode the image signal on a field-by-field basis.

3. The apparatus according to claim 2, wherein the BRCV is a block-frame difference (referred to BRD) for said each of the contour blocks and the BDCV is a block-field difference (referred to BDD) for said each of the contour blocks, the BRD being a sum of absolute first differences, each first difference being an error between a line pair including an even-line and an adjacent odd-line of said each of the contour blocks; and the BDD being a sum of absolute second differences and absolute third differences, each second difference and each third difference being errors between a consecutive even-line pair and between a consecutive odd-line pair, respectively, of said each of the contour blocks.

4. The apparatus according to claim 3, wherein said coding mode deciding means first counts a first number of first contour blocks and a second number of second contour blocks, each of the first contour blocks being a contour block having a corresponding BRD equal to or less than a corresponding BDD and each of the second contour blocks being a contour block having a corresponding BRD greater than a corresponding BDD; and then said coding mode deciding means generates a frame coding mode signal if the first number is equal to or greater than the second number and generates a field coding mode signal if the first number is less than the second number.

5. The apparatus according to claim 4, further comprising:

means, in response to the frame coding mode signal, for dividing the padded texture signal to thereby supply a plurality of equal-sized frame blocks of K×L pixels with K and L being predetermined positive integers, respectively, and, in response to the field coding mode signal, splitting the padded texture signal into a top-field and a bottom-field thereof and then dividing the top-field into a plurality of equal-sized top-field blocks of K×L pixels and dividing the bottom-field into a plurality of equal-sized bottom-field blocks of K×L pixels to thereby provide the top-field blocks of K×L pixels and the bottom-field blocks of K×L pixels.

6. The apparatus according to claim 5, wherein said dividing means includes:

means, in response to the frame coding mode signal, for selecting a frame-by-frame coding path to thereby provide the padded texture signal as a frame and, in response to the field coding mode signal, selecting a field-by-field coding path to thereby split the padded texture signal into a top-field and a bottom-field and then provide the top-field and the bottom-field;

means for frame block dividing to divide the frame into the plurality of the equal-sized frame blocks of K×L pixels and then supplying the frame blocks of K×L pixels, wherein each of the frame blocks of K×L pixels is made by combining a top-field block of K×(L/2) pixels having only even-lines with a bottom-field block of K×(L/2) pixels having only odd-lines; and means for field block dividing to divide the top-field into the plurality of the equal-sized top-field blocks of K×L pixels and dividing the bottom-field into the plurality of the equal-sized bottom-field blocks of K×L pixels to thereby supply the top-field blocks of K×L pixels and the bottom-field blocks of K×L pixels, wherein each of the top-field blocks of K×L pixels and each of the bottom-field blocks of K×L pixels have only even-lines and only odd-lines, respectively.

7. The apparatus according to claim 6, wherein M and N are 16's, respectively.

8. The apparatus according to claim 7, wherein the BRD and the BDD are calculated by the following equations 1 and 2, respectively,:

$$BRD = \sum_{i=0}^{6} \sum_{j=0}^{15} (|P_{2i,j} - P_{2i+1,j}| + |P_{2i+1,j} - P_{2i+2,j}|), \quad \text{(Equation.1.)}$$

$$BDD = \sum_{i=0}^{6} \sum_{j=0}^{15} (|P_{2i,j} - P_{2i+2,j}| + |P_{2i+1,j} - P_{2i+3,j}|) \quad \text{(Equation.2.)}$$

wherein $P_{h,v}$ represents a luminance value of a pixel located at the intersection of the h-th horizontal line and the v-th vertical line within said each of the contour blocks, each of h and v ranging from 0 to 15.

9. The apparatus according to claim 2, wherein the BRCV is a block-frame square error (referred to BRS) for said each of the contour blocks and the BDCV is a block-field square error (referred to BDS) for said each of the contour blocks, the BRS being a sum of first square errors, each first square error being a square error between a line pair including an even-line and an adjacent odd-line of said each of the contour blocks; and the BDS being a sum of second square errors and third square errors, each second square error and each third error being square errors between a consecutive even-line pair and between a consecutive odd-line pair, respectively, of said each of the contour blocks.

10. The apparatus according to claim 9, wherein said coding mode deciding means sums up all of corresponding BRS's for all of the contour blocks to thereby generate a first sum and at the same time sums up all of corresponding BDS's for all of the contour blocks to thereby generate a second sum; and then compares the first sum with the second sum to thereby generate a frame coding mode signal if the ratio of the first sum over the second sum is equal to or less than a predetermined threshold value and generate a field coding mode signal if the ratio of the first sum over the second sum is greater than a predetermined threshold value.

11. A method for use in an apparatus to adaptively encode an image signal including a contour signal and a texture signal having object pixels within an object and background pixels within a background thereof, wherein the contour signal discriminates between the object pixels and the background pixels and each of the background pixels and the object pixels is represented by luminance data and chrominance data, the method comprising the steps of:

(a) performing padding to replace each pixel value of the background pixels with a pixel value derived from values of the object pixels by using the contour signal in accordance with a predetermined padding method to thereby generate a padded texture signal;

(b) extracting luminance data from the padded texture signal to thereby provide a modified texture signal, wherein each pixel of the modified texture signal has only the luminance data; and (c) frame/field correlation evaluating, based on the contour signal and the modified texture signal, to evaluate a frame-correlation of a frame of the modified texture signal and a field-correlation of the top-field and the bottom-field thereof in accordance with a predetermined rule and then decide to encode the image signal on a frame-by-frame basis if the frame-correlation is higher than the field-correlation, thereby generating a frame coding mode signal and decide to encode the image signal on a field-by-field basis if the frame-correlation is not higher than the field-correlation, thereby generating a field coding mode signal, wherein the frame-correlation and the field-correlation are calculated in accordance with a predetermined rule.

12. The method according to claim 11, wherein said step (c) includes the steps of:

(c1) detecting a plurality of equal-sized contour blocks of M×N pixels with M and N being predetermined positive integers, respectively, by using the contour signal and the modified texture signal to thereby supply the contour blocks, wherein each of the contour blocks is a block having one or more background pixels and one or more object pixels; and a frame of said each of the contour blocks is made by combining a top-field block having even-lines with a bottom-field block having odd-lines;

(c2) calculating a block-frame correlation value (referred to BRCV) and a block-field correlation value (referred to BDCV) for said each of the contour blocks to thereby produce BRCV's and the BDCV's for said contour blocks, wherein the BRCV is a correlation value calculated in accordance with a predetermined rule for the frame of said each of the contour blocks and the BDCV is a correlation value calculated in accordance with the predetermined rule for the top-field block and the bottom-field block of said each of the contour blocks; and (c3) deciding coding mode of the image signal based on the BRCV's and the BDCV's to thereby generate either the frame coding mode signal commanding to encode the image signal on a frame-by-frame basis or the field coding mode signal commanding to encode the image signal on a field-by-field basis.

13. The method according to claim 12, wherein the BRCV is a block-frame difference (referred to BRD) for said each of the contour blocks and the BDCV is a block-field difference (referred to BDD) for said each of the contour blocks, the BRD being a sum of absolute first differences, each first difference being an error between a line pair including an even-line and an adjacent odd-line of said each of the contour blocks; and the BDD being a sum of absolute second differences and absolute third differences, each second difference and each third difference being errors between a consecutive even-line pair and between a consecutive odd-line pair, respectively, of said each of the contour blocks.

14. The method according to claim 13, wherein in said step (c3) a first number of first contour blocks and a second number of second contour blocks are counted, each of the first contour blocks being a contour block having a corresponding BRD equal to or less than a corresponding BDD and each of the second contour blocks being a contour block having a corresponding BRD greater than a corresponding BDD; and then a frame coding mode signal is generated if the first number is equal to or greater than the second number and a field coding mode signal is generated if the first number is less than the second number.

15. The method according to claim 14, further comprising the step of:

(d) dividing the padded texture signal in response to the frame coding mode signal, thereby supplying a plurality of equal-sized frame blocks of K×L pixels with K and L being predetermined positive integers, respectively, and, in response to the field coding mode signal, splitting the padded texture signal into a top-field and a bottom-field thereof and then dividing the top-field into a plurality of equal-sized top-field blocks of K×L pixels and dividing the bottom-field into a plurality of equal-sized bottom-field blocks of K×L pixels to thereby provide the top-field blocks of K×L pixels and the bottom-field blocks of K×L pixels.

16. The method according to claim 15, wherein said step (d) includes the steps of:

(d1) selecting a frame-by-frame coding path in response to the frame coding mode signal, thereby providing the padded texture signal as a frame and selecting a field-by-field coding path in response to the field coding mode signal, thereby splitting the padded texture signal into a top-field and a bottom-field and then providing the top-field and the bottom-field;

(d2) frame block dividing to divide the frame into the plurality of the equal-sized frame blocks of K×L pixels and then supplying the frame blocks of K×L pixels, wherein each of the frame blocks of K×L pixels is made by combining a top-field block of K×(L/2) pixels having only even-lines with a bottom-field block of K×(L/2) pixels having only odd-lines; and (d3) field block dividing to divide the top-field into the plurality of the equal-sized top-field blocks of K×L pixels and dividing the bottom-field into the plurality of the equal-sized bottom-field blocks of K×L pixels to thereby supply the top-field blocks of K×L pixels and the bottom-field blocks of K×L pixels, wherein each of the top-field blocks of K×L pixels and each of the bottom-field blocks of K×L pixels have only even-lines and only odd-lines, respectively.

17. The method according to claim 16, wherein M and N are 16's, respectively.

18. The method according to claim 17, wherein the BRD and the BDD are calculated by the following equations 1 and 2, respectively,:

$$BRD = \sum_{i=0}^{6} \sum_{j=0}^{15} (|P_{2i,j} - P_{2i+1,j}| + |P_{2i+1,j} - P_{2i+2,j}|), \quad \text{(Equation.1.)}$$

$$BDD = \sum_{i=0}^{6} \sum_{j=0}^{15} (|P_{2i,j} - P_{2i+2,j}| + |P_{2i+1,j} - P_{2i+3,j}|) \quad \text{(Equation.2.)}$$

wherein $P_{h,v}$ represents a luminance value of a pixel located at the intersection of the h-th horizontal line and the v-th vertical line within said each of the contour blocks, each of h and v ranging from 0 to 15.

19. The method according to claim 12, wherein the BRCV is a block-frame square error (referred to BRS) for said each of the contour blocks and the BDCV is a block-field square error (referred to BDS) for said each of the contour blocks, the BRS being a sum of first square errors, each first square error being a square error between a line pair including an even-line and an adjacent odd-line of said each of the contour blocks; and the BDS being a sum of second square errors and third square errors, each second square error and each third error being square errors between a consecutive even-line pair and between a consecutive odd-line pair, respectively, of said each of the contour blocks.

20. The method according to claim 19, wherein in said step (c3), all of corresponding BRS's for all of the contour blocks are summed up to thereby generate a first sum and at the same time all of corresponding BDS's for all of the contour blocks are summed up to thereby generate a second sum; and then the first sum is compared with the second sum to thereby generate a frame coding mode signal if the ratio of the first sum over the second sum is equal to or less than a predetermined threshold value and generate a field coding mode signal if the ratio of the first sum over the second sum is greater than a predetermined threshold value.

* * * * *